United States Patent
Canolle et al.

(10) Patent No.: US 12,083,901 B2
(45) Date of Patent: Sep. 10, 2024

(54) DEVICE FOR CAPTURING AN ELECTRIC CURRENT FOR A RAIL VEHICLE

(71) Applicant: MERSEN France SB SAS, Saint-Bonnet-de-Mure (FR)

(72) Inventors: Florent Canolle, Lyons (FR); Olivier Dosda, Cremieu (FR)

(73) Assignee: MERSEN France SB SAS, Saint-Bonnet-de-Mure (FR)

(*) Notice: Subject to any disclaimer, the term of this patent is extended or adjusted under 35 U.S.C. 154(b) by 897 days.

(21) Appl. No.: 17/262,099

(22) PCT Filed: Jul. 26, 2019

(86) PCT No.: PCT/EP2019/070179
§ 371 (c)(1),
(2) Date: Jan. 21, 2021

(87) PCT Pub. No.: WO2020/021065
PCT Pub. Date: Jan. 30, 2020

(65) Prior Publication Data
US 2021/0291662 A1    Sep. 23, 2021

(30) Foreign Application Priority Data

Jul. 27, 2018 (FR) ..................... 1857034

(51) Int. Cl.
*B60L 5/38* (2006.01)
*B60L 3/00* (2019.01)

(52) U.S. Cl.
CPC ............. *B60L 5/38* (2013.01); *B60L 3/0038* (2013.01); *B60L 2200/26* (2013.01); *B60Y 2200/30* (2013.01); *B60Y 2400/305* (2013.01)

(58) Field of Classification Search
CPC ...... B60L 5/38; B60L 3/0038; B60L 2200/26; B60Y 2200/30; B60Y 2400/305
See application file for complete search history.

(56) References Cited

FOREIGN PATENT DOCUMENTS

| CN | 105222701 A | * | 1/2016 | ............... G01B 7/16 |
| CN | 205981506 U | | 2/2017 | |
| CN | 106965681 A | * | 7/2017 | ............... B60L 5/39 |
| CN | 108489652 A | | 9/2018 | |
| EP | 1975584 A2 | | 10/2008 | |

(Continued)

OTHER PUBLICATIONS

English Abstract Translation for Publication No. JP6110706.
(Continued)

*Primary Examiner* — Robert J McCarry, Jr.
(74) *Attorney, Agent, or Firm* — Soquel Group LLC

(57) ABSTRACT

A device for capturing an electric current for a rail vehicle includes a pad intended to come into contact with an electric power rail, a frame and an electrically conductive arm which mechanically and electrically connects the frame to the pad. The capture device includes a device for measuring the mechanical forces exerted on the arm. The device includes strain sensors which are in contact with the arm and integrated on the inside of an electrical isolation structure, such that the strain sensors may be electrically isolated from the arm. The isolation structure includes a glue layer and a ceramic layer covering the glue layer. The strain sensors are arranged on the ceramic layer.

10 Claims, 5 Drawing Sheets

(56) References Cited

FOREIGN PATENT DOCUMENTS

| EP | 3354510 | A1 | | 8/2018 | |
|----|---------|----|---|--------|---|
| GB | 2315722 | A | * | 2/1998 | ............... B60L 5/08 |
| JP | 6110706 | A | | 1/1986 | |
| JP | 63242105 | A | | 10/1988 | |
| JP | 11194059 | A | | 7/1999 | |
| JP | 2008151775 | A | | 7/2008 | |
| JP | 2011205774 | A | | 10/2011 | |
| JP | 2012105394 | | | 5/2012 | |
| JP | 2017200393 | A | | 11/2017 | |
| JP | 2018115944 | A | | 7/2018 | |
| WO | 2015110325 | A1 | | 7/2015 | |
| WO | 2018086689 | A1 | | 5/2018 | |

OTHER PUBLICATIONS

English Abstract Translation for Publication No. JP2008151775.
English Abstract Translation for Publication No. JP2012105394.
English Abstract Translation for Publication No. JP2011205774.
English Abstract Translation for Publication No. JP2018115944.
English Abstract Translation for Publication No. JP2017200393.
English Abstract Translation for Publication No. JP63242105.
EPO English Abstract Translation for Publication No. JP11194059.
Translation CN105222701A.
Machine Translation, CN205981506U.
EPO Patent Translation of CN106965681A.
EPO Patent Translation of CN108489652A.
Thomson Scientific, London, GB, vol. 2016, No. 08, AN 2016-037594, Retrieved from: Database WPI [online] & Abstract for CN105222701A, Jan. 6, 2016, 2 pp.
Gregory, O. J. et al., "Ceramic Strain Gages for Propulsion Health Monitoring," Digital Avionics Systems Conferences, 2000, Proceedings Dasc. the 19th, Oct. 7-13, 2000, Piscataway, NJ, USA, IEEE, vol. 2, Oct. 7, 2000, 8 pp.
PCT International Search Report for Patent Application No. PCT/EP2019/070179, Oct. 25, 2019, 3 pp.

* cited by examiner

DEVICE FOR CAPTURING AN ELECTRIC CURRENT FOR A RAIL VEHICLE

CROSS-REFERENCE TO RELATED APPLICATIONS

This application claims benefit under 35 USC § 371 of PCT Application No. PCT/EP2019/070179 entitled DEVICE FOR CAPTURING AN ELECTRIC CURRENT FOR A RAIL VEHICLE, filed on Jul. 26, 2019 by inventors Florent Canolle and Olivier Dosda. PCT Application No. PCT/EP2019/070179 claims priority of French Patent Application No. 18 57034, filed on Jul. 27, 2018.

FIELD OF THE INVENTION

The present invention relates to a device for capturing an electric current for a rail vehicle. Aspects of the invention also relates to a rail vehicle including this capture device.

BACKGROUND OF THE INVENTION

Rail vehicles with electric traction are known which are suitable for being supplied with electricity owing to an outside supply device, such as a third rail running along the track on which the vehicle travels. Such vehicles generally include a capture device for collecting an electric current from this power rail.

The capture device includes a pad which comes into contact with the rail and which is connected to a frame by means of an arm. Typically, the arm is electrically conductive and makes it possible to convey the electric current sampled by the pad.

One drawback of these capture devices is that the arm may deform (or break) when the vehicle travels, for example due to a collision with an obstacle on the track. When the arm is electrically conductive, such a deformation (or break) can cause a risk of short-circuit or derailment if the vehicle is not stopped in time.

There is therefore a need for a device for capturing a current for a rail vehicle which addresses these drawbacks.

SUMMARY OF THE INVENTION

To this end, the invention relates to a device for capturing an electric current for a rail vehicle, the capture device including:
  a pad intended to come into contact with an electric power rail;
  a frame;
  an electrically conductive arm which mechanically and electrically connects the frame to the pad, the arm including a central part coupling the frame to a support portion on which the pad is mounted.
The capture device includes an apparatus for measuring the mechanical forces exerted on the arm, the measuring apparatus including strain sensors which are integrated on the inside of an electrical isolation structure, such that said strain sensors can be electrically insulated from the arm, the isolation structure including a glue layer deposited on a receiving surface and a ceramic layer covering the glue layer, the strain sensors being arranged on the ceramic layer.

The measuring apparatus allows a real-time measurement of the mechanical forces experienced by the arm. The isolation structure allows the strain sensors to be electrically isolated from the arm.

The measuring apparatus therefore allows a reliable measurement, since the sensors are placed as close as possible to the arm, without increasing the risk of leakage of the collected electric current from the arm toward the measuring apparatus.

The isolation structure avoids the use of a galvanic isolation circuit, which is advantageous, since the addition of such a galvanic isolation circuit would increase the cost and complexity of the capture device.

According to advantageous but optional aspects of the invention, this capture device may incorporate one or more of the following features, considered alone or according to any technically allowable combination:
  The measuring apparatus is mounted on an upper face of the central part of the arm.
  The measuring apparatus is mounted on a side face of the central part of the arm.
  The measuring apparatus includes two groups of strain sensors, each group of sensors being associated with a measuring circuit, the two groups of sensors being mounted on the same face of the central part and placed at different distances from the frame.
  The frame includes an arm support, the central part of the arm including an orifice for receiving a centering pin mounted on an arm support, the arm further including a washer which is at least partially received in the orifice while being mounted around the centering pin and compressed between the central part of the arm and the arm support, such that the arm rests on the arm support by means of the washer, the measuring apparatus being mounted on an outer receiving surface of the washer.
  The measuring apparatus also includes a temperature sensor placed near at least one of the strain sensors.
  The isolation structure further includes an encapsulating layer made from resin or varnish which covers the strain sensors.
  The thickness of the glue layer is between 10 µm and 1 mm.
  The thickness of the ceramic layer is between 0.05 mm and 3 mm.

According to another aspect, the invention relates to a current capture system for a rail vehicle, characterized in that the system includes a device for capturing electric current as previously described and a processing unit connected to the measuring apparatus and programmed to detect a break of the arm and/or to calculate a contact force between the pad and an electric power rail from strain measurements coming from the measuring apparatus.

BRIEF DESCRIPTION OF THE DRAWINGS

The invention will be better understood and other advantages thereof will appear more clearly in light of the following description of one embodiment of a device for capturing electric current, provided solely as a non-limiting example and done in reference to the appended drawings, in which.

DETAILED DESCRIPTION OF EMBODIMENTS

Figure 1:
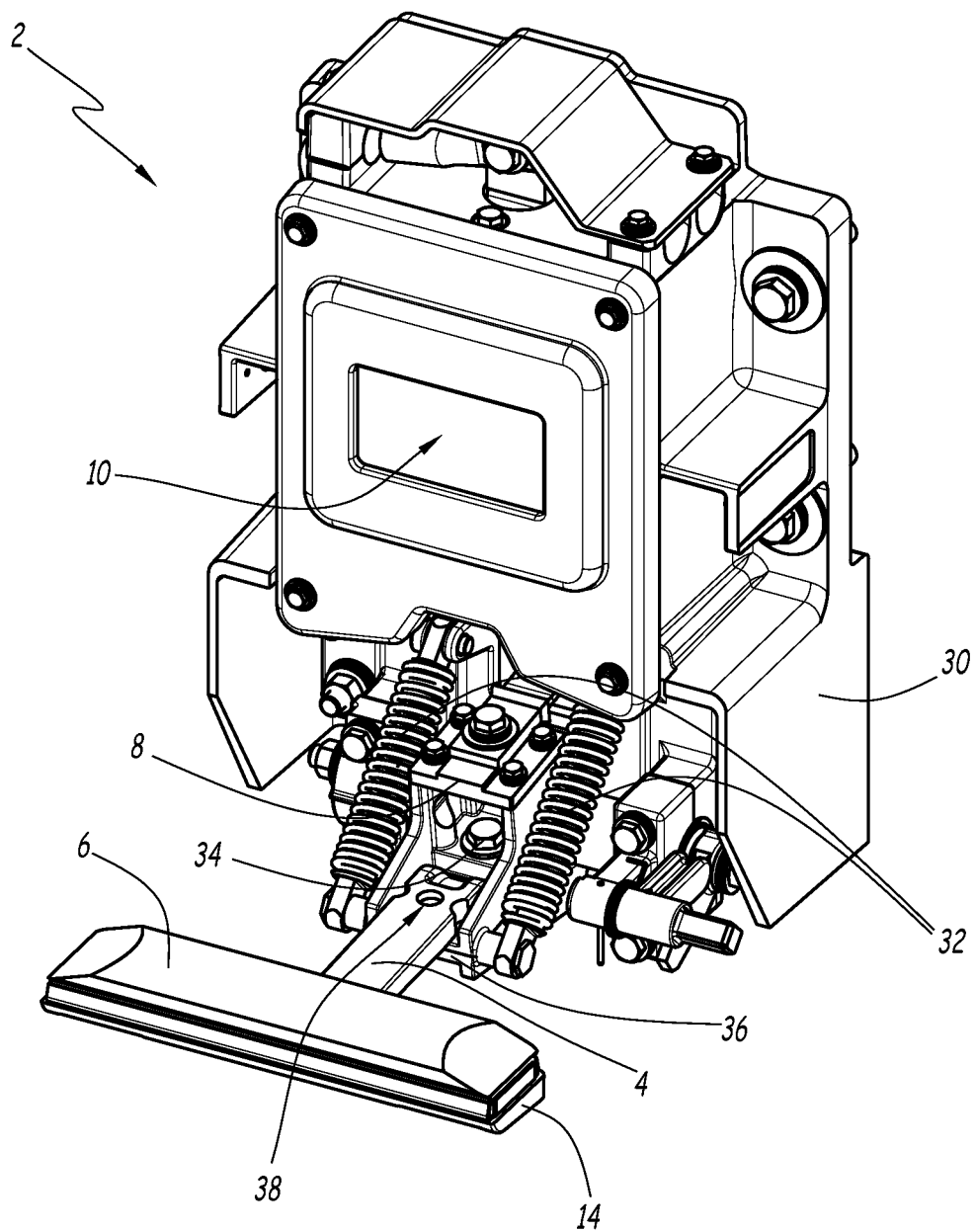
FIG. 1 schematically shows a device for capturing electric current for a rail vehicle according to embodiments of the invention.

FIG. 1 shows a device 2 for capturing an electric current for a rail vehicle. The device 2 is able to cooperate with an electric power rail, in order to collect electric current from the electric power rail. The device 2 next makes it possible to convey the collected current to an electric power circuit on board the rail vehicle, for example to power an electric traction chain of the rail vehicle.

According to examples, the power rail is a third rail positioned along the railroad track on which the rail vehicle travels.

Figure 2:
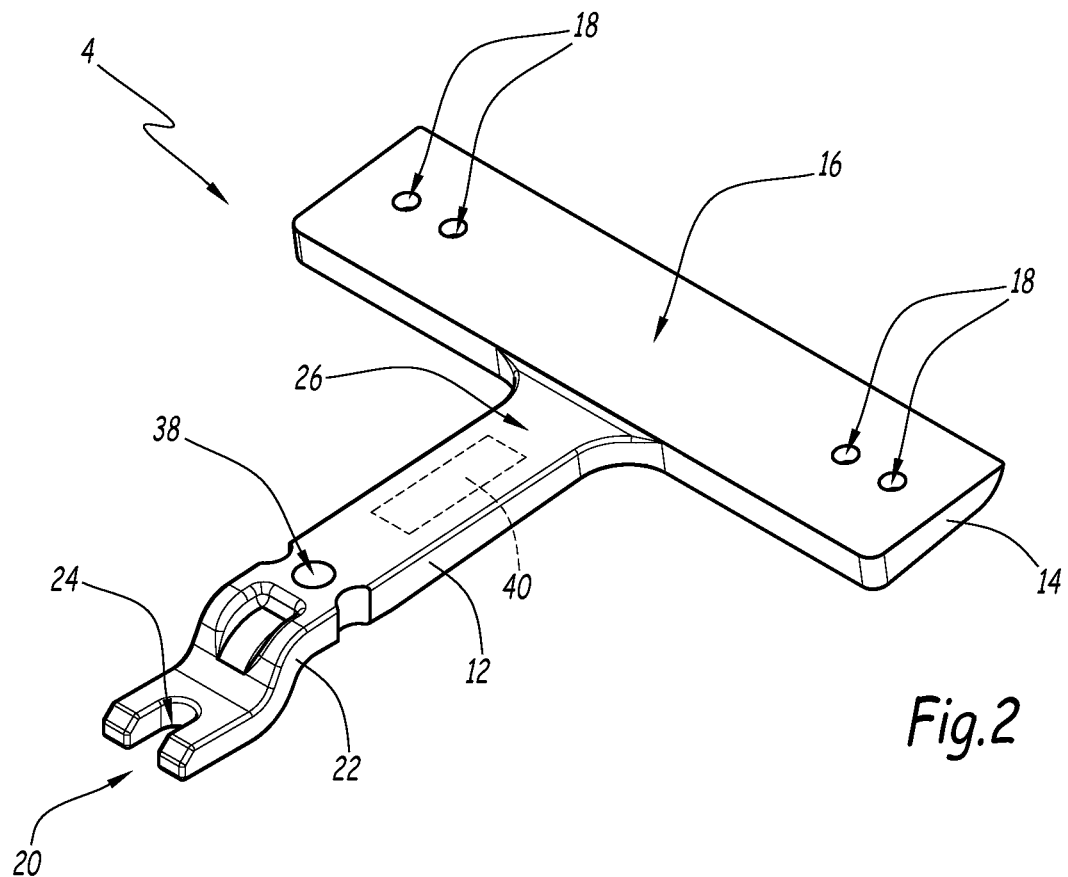
FIG. 2 schematically shows part of the device for capturing current of FIG. 1 according to a first embodiment of the invention.

As illustrated in FIGS. 1 and 2, the device 2 includes an arm 4, a collection pad 6 and a frame 8 forming a support for the arm 4.

The pad 6 is intended to come into direct contact with the electric power rail in order to sample electric current from the electric power rail when the latter is supplied with electricity.

The pad 6 is made from electrically conductive material, preferably from carbon or a carbonaceous material.

In the illustrated example, the pad 6 is in the form of an elongated slab with a base in the form of a quadrilateral, although in a variant the geometry of the pad 6 could be adapted based on the arrangement of the power rail.

The arm 4 couples the pad 6 to the frame 8, both mechanically and electrically. Preferably, the arm 4 is rigid.

The arm 4 is made from an electrically conductive material, such as a metal, for example copper or aluminum, or a metal alloy, such as a copper-aluminum alloy, or cast-iron, or a carbonaceous alloy. The arm 4 makes it possible to convey the electric current collected by the pad 6.

FIG. 2 shows an example of the arm 4 in isometric perspective top view.

According to embodiments, the arm 4 includes a central main part 12 and a support part 14 of the pad 6.

For example, the main part 12, or central part, includes an essentially rectilinear bar which here has a rectangular cross-section.

The main part 12 in particular has an upper face 26, a lower face and side faces 28. For example, the face 26 is horizontal and the side faces 28 are vertical when the device 2 is in a mounted configuration.

In a variant, the central part 12 can have a different shape. For example, the bar can have a circular section or a trapezoidal section. The central part 12 can also assume a plate shape.

The part 14 here includes a plate comprising a contact face 16 with the pad 6 and orifices 18 for receiving fastening members of the pad 6. The pad 6 is fastened on the face 16 and is in contact with the face 16. Preferably, the parts 12 and 14 are formed in a single piece.

The part 14 is formed at a distal end of the main part 12. The face 16, as well as the part 14, are essentially planar and are elongated here perpendicular to the main part 12, for example horizontally. The shape and the arrangement of the part 14 depend on the positioning of the power rail.

In practice, the outer power rail extends parallel to a longitudinal axis of the rail vehicle on which the device 2 is mounted, such that the pad 6 and the face 16 are then aligned with the power rail and the main part 12 extends perpendicularly while protruding relative to one of the side faces of the vehicle.

In the illustrated example, when the device 2 is mounted on the rail vehicle, the face 16 faces upward, to allow the pad 6 to come into contact with a lower face of the power rail, for example in the case of a capture mode by the top of the power rail.

According to variants which are not illustrated, the face 16 faces downward, which allows the pad 6 to come into contact with an upper face of the power rail, for example in the case of a capture mode by the top of the power rail.

The main part 12 also includes a proximal end 20 by which the arm 4 is attached or anchored to the frame 8. For example, the end 20 includes an orifice 24 which is intended to receive a fastening element 34, such as a screw or a threaded rod, in order to fasten and clamp the arm 4 on the frame 8. In FIG. 1, only the head of the fastening element 34 is visible.

According to examples, the central part 12 can include a bent portion 22 near the proximal end 20.

In FIG. 1, reference 36 designates an arm support belonging to the frame 8, here in bar form. The arm support 36 is located below the arm 4 and allows the arm 4 to rest on the support 36.

According to embodiments, the arm support 36 includes a centering pin, for example protruding from an upper face of the arm support 36 while being integral with the arm support 36. The arm 4 advantageously includes a receiving orifice 38 in which the centering pin is received when the arm 4 is in the mounted configuration. The orifice 38 here is formed on the central part 12, for example toward the end 20. The centering pin makes it possible to prevent a shift or an accidental off-centering of the arm 4.

The device 2 also includes an electric circuit 10 which collects the sampled current, and a protective case 30, or protective soleplate, which at least partially surrounds the frame 8 and the circuit 10.

For example, the case 30 is made from an electrically insulating material.

For example, the circuit 10 includes one or several connection terminals connected to an electric power circuit embedded in the rail vehicle.

It will therefore be understood that the pad 6 is electrically connected to the circuit 10 by means of the arm 4. For example, the frame 8 is electrically conductive and connects the end 20 of the arm 4 to the circuit 10. According to one example, the circuit 10 includes electrical protection equipment, such as a fuse.

Indeed, in some applications, the use of a conductive arm 4 is preferable to the use of an isolating arm, since the isolating arm also requires the addition of a dedicated conductor, such as a cable or a connecting bar of the busbar type, to electrically connect the pad.

According to optional and illustrative examples, the frame 8 is shared between a moving part secured to the arm 4 and a stationary part, for example secured to the case 30. The moving part is free to move relative to the stationary part, here by pivoting about a horizontal axis which is parallel to the longitudinal direction of the part 14. One or several springs 32, such as helical traction springs, extend between the stationary and moving parts of the frame 8 in order to bring the moving part back into a position in contact with the power rail. This allows the device 2 to tolerate any height variations of the power rail relative to the railroad track and to exert a force on the rail making it possible to ensure a good quality capture of the current. The spring(s) 32 can, in a variant which is not illustrated, be replaced by torsion springs mounted around the pivot link.

In practice, in a usage configuration, the device 2 is mounted on a rail vehicle, for example by attaching the protective case on a lower part of the rail vehicle, preferably on a bogie or on a box bottom of the rail vehicle. The same rail vehicle may include several devices 2 connected to the electric power circuit of the vehicle.

The device 2 includes a measuring apparatus 40 in order to measure the mechanical forces exerted on the arm 4. The measuring apparatus 40 includes strain sensors which are in contact with the arm 4.

For example, the strain sensors are strain gauges, also called strain meters.

According to one illustrative example, each strain gauge includes one or several thin layers of an electrically conductive material, preferably a metallic material.

When the gauge is subject to a deformation, for example because the surface on which it is deposited deforms, the elastic properties of the gauge are modified, which makes it possible to quantify the deformation of the gauge by measuring the variations of an electric current passing through the gauge.

Preferably, the strain sensors make it possible, when they are in contact with the arm of the device 2, to measure a force experienced by the arm greater than or equal to 50 N or greater than or equal to 100 N and less than or equal to 5000 N or less than or equal to 3000 N.

This value range allows the strain sensors to measure a deformation (typically less than 1000 N) of the arm and also to detect a break of the arm (breaking strength greater than 1000 N).

For example, the measuring allowance of the measuring apparatus 40 for force value intervals greater than 1000 N is higher than the measuring allowance for the force value interval less than 1000 N. For the latter interval, the measuring allowance is preferably less than 5% or less than 2%.

According to embodiments, the measuring apparatus 40 is mounted on the arm 4, preferably on the central part 12.

In the illustrated example, the apparatus 40 is mounted on the upper face 26 of the central part 12, which is then said to form a "receiving surface" for the strain sensors. The strain sensors are then in contact with the upper face 26.

For example, in the present disclosure, the measuring apparatus 40 is said to be "mounted" on a surface when the strain sensors of the apparatus 40 are mounted on this surface, that is to say when they are fastened, directly or indirectly, to this surface.

According to other embodiments, the apparatus 40 is mounted on one of the side faces 28 of the central part 12, which is then said to form a receiving surface for the strain sensors. The strain sensors are then in contact with said side face 28.

Figure 3:
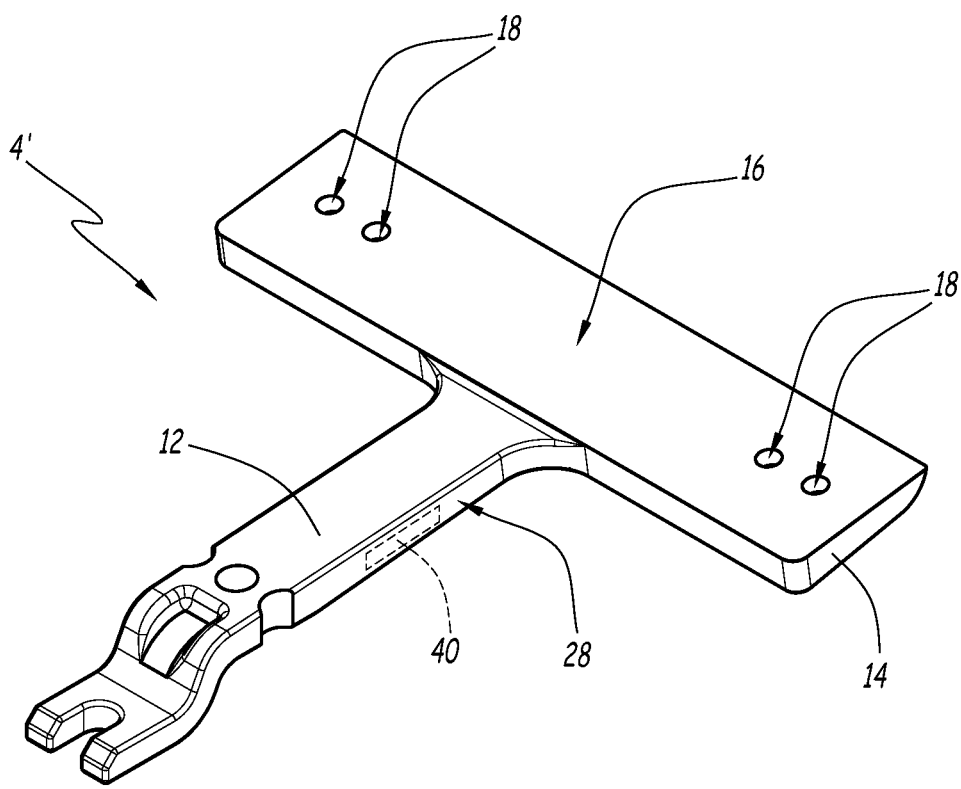
FIG. 3 schematically shows part of the device for capturing current of FIG. 1 according to a second embodiment of the invention.

For example, FIG. 3 shows an arm 4' according to another embodiment. The arm 4' is similar to the arm 4 except that the measuring apparatus 40 is now fastened on a side face 28 of the central part 12 of the arm 4'.

Aside from this difference, the arm 4' is similar to the arm 4 and everything which is described in reference to the arm 4 can be transposed to the arm 4', such that only the arm 4 is described hereinafter.

For example, placing the measuring apparatus 40 on the upper face 26 makes it possible to more precisely measure the vertical component of the flexural forces exerted on the arm 4, while placing the measuring apparatus 40 on the upper face 26 allows more precise measurement of the lateral flexural forces experienced by the arm 4'.

Figure 4:
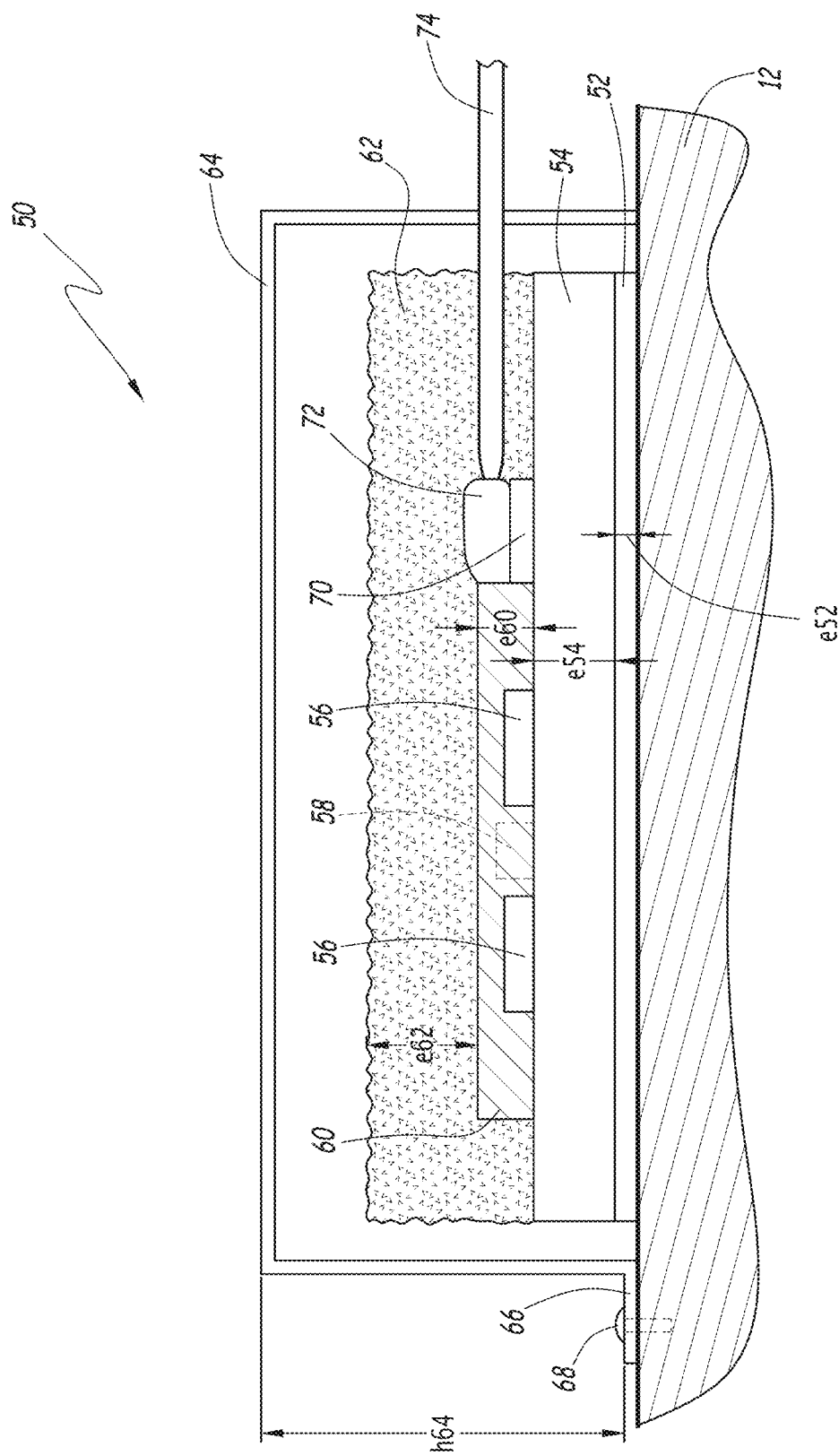
FIG. 4 schematically shows, in sectional view, a measuring apparatus equipping the device for capturing a current of FIG. 1.

The measuring apparatus 40 includes at least one measuring unit 50, an example of which is illustrated in FIG. 4. The strain sensors are comprised in one or several measuring units 50.

In this example, the measuring apparatus 40 includes a single measuring unit 50.

The measuring unit 50 includes an electrical isolation structure including a glue layer 52 and a ceramic layer 54 covering the glue layer 52.

The glue layer 52 is deposited on the receiving surface of the arm 4, for example on the upper face 26 or on one of the side faces 28, depending on the case. For example, the ceramic layer 54 is in direct contact with the glue layer 52.

According to examples, the glue layer 52 is an adhesive, preferably thermosetting, such as an epoxide resin.

The strain sensors, which here bear the reference "56", are deposited on the ceramic layer 54 and are in indirect contact with the arm 4.

In the described examples, the layers of the isolation structure are planar and have an essentially constant thickness (that is to say a constant thickness to within 10% and preferably to within 5%), unless otherwise specified.

Preferably, all or some of the strain sensors 56 are connected to one another within a measuring circuit, such as a Wheatstone bridge.

For example, the measuring unit 50 includes four sensors 56 (only two of which are visible in FIG. 4) connected to one another to form a measuring circuit.

In a variant, the number of sensors 56 can be different.

Advantageously, the sensors 56 are connected within each measuring circuit by electrically conductive tracks, for example metallic tracks, which are deposited on the ceramic layer 54, for example similarly to the conductive tracks of a printed circuit.

According to variants, several measuring circuits are used in the measuring apparatus 40. Each measuring circuit includes a group including several sensors 56. In this case, the groups of sensors 56 are preferably in contact with the same face of the central part 12 and are spaced apart from one another while being placed at different distances from the frame 8 to which the arm 4 is connected.

For example, two measuring circuits are aligned along the central part 12, the first group of sensors 56 being placed at a distance D1 from the anchoring point of the central part 12 and the second group of sensors 56 being placed at a distance D2 from the anchoring point of the central part 12.

According to a first example, the measuring apparatus 40 includes a measuring unit 50 including at least two separate measuring circuits.

According to a second example, the measuring apparatus 40 includes two measuring units 50 each including a measuring circuit. The two measuring units 50 are placed at different locations of the face of the central part 12.

Using several measuring circuits in contact with a same face of the arm makes it possible to perform a differential measurement of the stresses experienced by the arm 4. For example, using two measuring circuits allows the apparatus 40 to determine the difference in bending moment experienced by the arm 4 between the two measuring circuits. The sensitivity of the measuring apparatus 40 is then proportional to the difference between the distances D1 and D2.

Advantageously, the measuring unit 50 can include a temperature sensor 58 placed in the vicinity of at least one of the strain sensors 56.

For example, the temperature sensor 58 includes a thermocouple or a thermistor, such as a probe with a negative temperature coefficient.

The temperature data measured by the sensor 58 in particular make it possible to correct the deformations measured by the sensors 56 in order to account for any drift due to high temperatures, for example resulting from heating of the device 2.

The temperature data measured by the sensor 58 can also be used to detect abnormal heating of the device 2, or to provide an indication on the electric current that passes through the arm 4.

In a variant, the temperature sensor 58 can be omitted.

According to advantageous embodiments, the electrical isolation structure further includes an encapsulating layer 60, made from resin or from electrically isolating varnish, which covers the strain sensors 56 and, if applicable, which also covers the associated conductive tracks.

For example, the encapsulating layer 60 is deposited on the ceramic layer 54, preferably only on the part of the surface of the ceramic layer 54 on which the strain sensors 56 are located. In other words, the encapsulating layer 60 partially covers the ceramic layer 54.

Advantageously, the electrical isolation structure also includes an additional protective layer 62 made from electrically isolating elastomer material, for example from silicone, which covers the encapsulating layer 60 and/or the ceramic layer 54.

According to optional embodiments, the measuring unit 50 includes a case 64 mounted on the receiving surface and which delimits an inner volume inside which the sensors 56 and the isolation structure are housed.

As an example, the measuring unit 50 here ensures a level of tightness greater than or equal to protection index IP66, for example owing to the case 64 and/or to the additional protective layer 62.

For example, the case 64 assumes the form of a hollow slab delimited by planar walls, although other shapes can also be considered, such as a curved or rounded shape. The height h64 of the case 64 here is less than or equal to 10 cm or to 1 cm, and preferably less than or equal to 5 mm.

According to examples, the case 64 includes, on its base, a fastening portion 66 in flange form, which makes it possible to fasten the case 64 to the receiving surface (in the case at hand, here, the central part 12) using fastening members 68 such as screws or rivets. In a variant, the case 64 can be fastened by gluing or by welding, and without necessarily needing the fastening portion 66.

As an illustrative example, the thickness e52 of the glue layer 52 is between 10 μm and 1 mm.

As an illustrative example, the thickness e54 of the ceramic layer 54 is between 0.05 mm and 3 mm, preferably between 0.1 mm and 0.5 mm, still more preferably between 0.2 mm and 0.4 mm.

As an illustrative example, the thickness e60 of the encapsulating layer is between 5 μm and 0.5 mm, preferably between 20 μm and 100 μm.

As an illustrative example, the thickness e62 of the additional protective layer 62, here measured relative to the upper surface of the encapsulating layer 60, is between 0.5 mm and 1 cm, preferably between 1 mm and 5 mm.

According to embodiments, each of the glue forming the layer 52 and the ceramic forming the layer 54 has a dielectric rigidity greater than or equal to 10 kV per millimeter. The resin or the varnish forming the encapsulating layer 60 has a dielectric rigidity greater than or equal to 100 kV per mm.

According to examples, the measuring apparatus 40 also allows the interconnection of the sensors 56 to a processing circuit installed on board the rail vehicle.

For example, each unit 50 includes one or several electrically conductive contact pads 70 arranged on the resin layer 54. The pads 70 are for example connected to the sensors 56 by means of the conductive tracks previously described. Each pad 70 is connected, by means of a weld 72, to a cable 74 which here comes out of the case 64 toward the interconnect circuit.

Preferably, each cable 74 includes an electrically insulating sheath, for example made from polymer, in particular from PTFE, having an overthickness relative to the radius of the core of the cable of at least 0.5 mm.

In the illustrated example, the pad 70, the weld 72 and part of the cable 74 are covered by the encapsulating layer 60.

According to advantageous embodiments, the sensors 56 and the isolation structure of each unit 50 are manufactured directly on the receiving surface, during a same method, by successive deposition of thin layers, for example using a vacuum deposition method.

For example, the first layer 52 is deposited on the receiving surface, preferably after cleaning the latter. The other layers are next deposited successively. The sensors 56 are preferably formed by depositing metal on the layer 54. For example, the temperature sensors 58 are also formed by depositing metal.

The geometry of the deposited layers can be defined using masks during the deposition and/or using etching methods, such as chemical etching or ion beam etching. Such methods can also be used to impart a predefined pattern to the deposited layers, for example to define a pattern so as to produce the sensors 56.

If applicable, the conductive tracks and the pads 70 are produced on the same occasion using similar methods. The welding 72 is for example done later, as well as the placement and the fastening of the case 64.

The manufacturing method can also include one or several heat treatment steps, in particular in order to structure one or several of the deposited layers, for example to harden the glue layer 52 after it is deposited when the glue is a thermosetting adhesive.

Owing to the embodiments of the invention, the measuring apparatus 40 allows a real-time measurement of the mechanical forces experienced by the arm 4. The isolation structure allows the strain sensors 56 to be in contact with the arm 4, while being electrically isolated from the arm 4.

In particular, the measuring apparatus 40 allows a reliable measurement, since the sensors 56 are placed as close as possible to the arm 4, without increasing the risk of leakage of the electric current when the collected electric current circulates in the arm between the pad 6 and the circuit 10.

The isolation structure avoids the use of a galvanic isolation circuit at the output of the sensors 56, which is advantageous, since the addition of such a galvanic isolation circuit would increase the cost and complexity of the device 2.

The isolation structure, and in particular the layers 52 and 54, here are fine enough to allow the sensors 56 to measure the deformation of the arm, while ensuring satisfactory electrical isolation of the sensors 56 with respect to the electrically conductive arm 4, even when the latter transports the collected electric current from the power rail.

For example, the isolation structure makes it possible to ensure a level of electrical isolation which complies with standard CEI 60077 when the electrical power voltage of the outside power rail is equal to 750 V dc.

Figure 5:
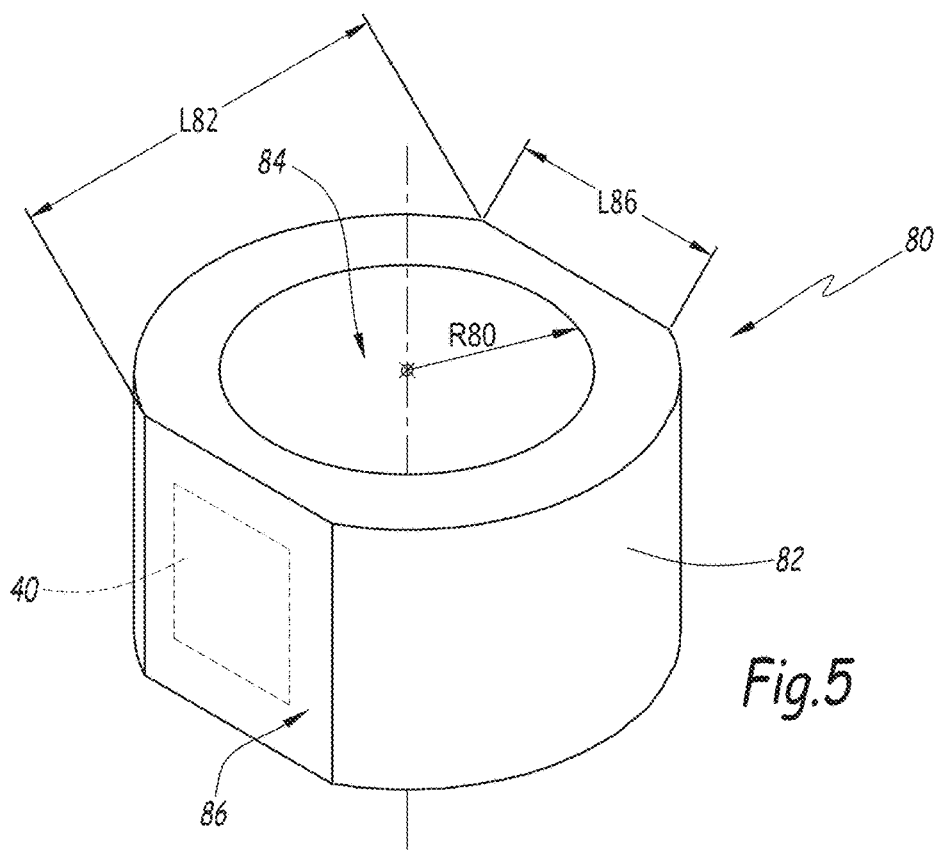
FIG. 5 schematically shows part of the device for capturing current of FIG. 1 according to a third embodiment of the invention.

FIG. 5 shows a washer 80 according to a third embodiment of the invention of the capture device. In this embodiment, the strain sensors 56 of the measuring apparatus 40 are positioned on a receiving surface formed by an outer face of the washer 80.

In the illustrated example, the washer 80 includes an essentially cylindrical hollow body 82 which delimits a central orifice 84. The body 82 includes one or several planar portions 86 arranged on the outer peripheral face of the body 82. The washer 80 here includes two faces 86 which are opposite one another.

Reference R80 designates the inner radius of the central orifice 84. Reference L82 designates the distance between the two faces 86. Reference L86 designates the width of a face 86.

As an illustration, the radius R80 is between 10 mm and 20 mm. The distance L82 is greater than or equal to 10 mm and less than or equal to 5 cm. The width L86 is greater than or equal to 5 mm and less than or equal to 5 cm or 2 cm.

In a mounted configuration of the device 2, the washer 80 is at least partially received in the receiving orifice 38 and here is therefore part of the arm 4.

Figure 6:
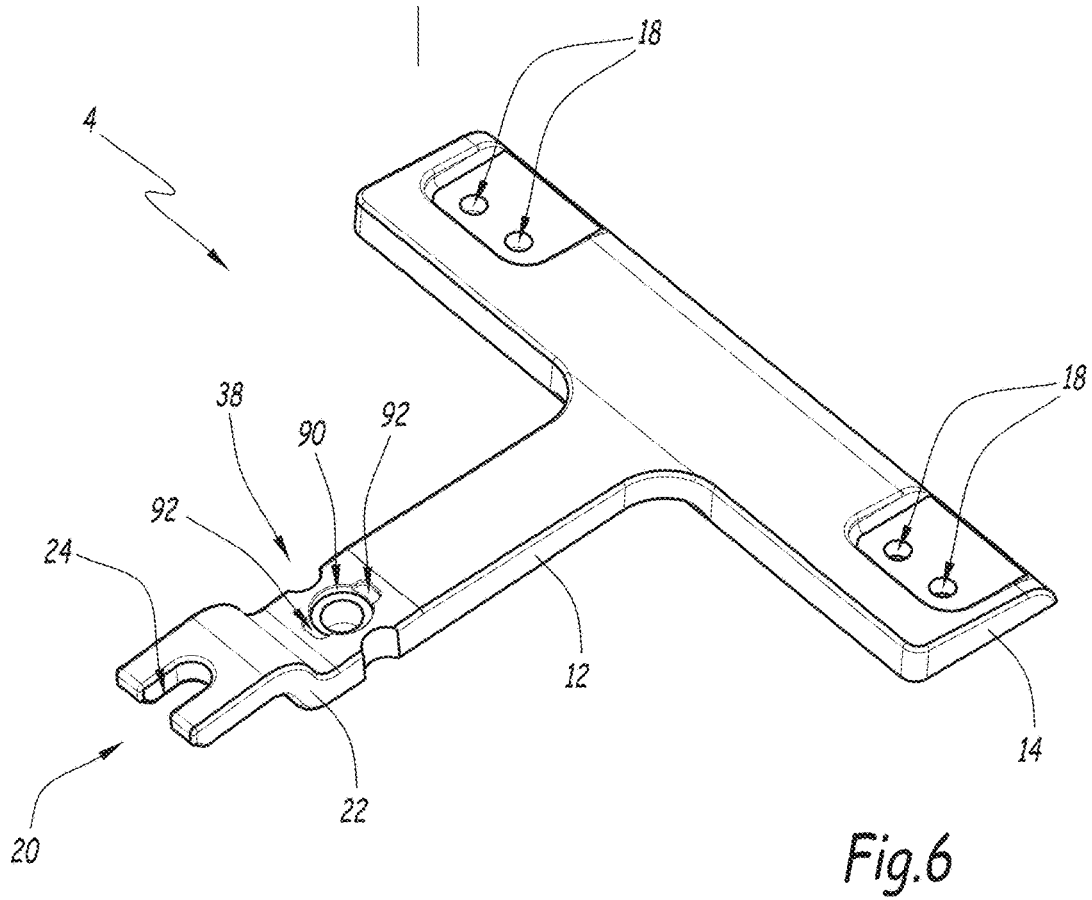
FIG. 6 schematically shows a lower view of the part of the capture device of FIG. 2.

FIG. 6 shows a bottom view of the arm 4 (or of the arm 4').

According to embodiments, the receiving orifice 38 includes a receiving zone 90 arranged to receive one end of the washer 80. For example, the receiving zone 90 includes a counterbore, or chamfer, arranged around a base of the receiving orifice 38 on a lower face of the part 12.

According to examples, the receiving orifice 38 includes a passage hole dimensioned to allow the passage of the centering pin, and the receiving zone 90 has a diameter larger than the diameter of the passage hole, in order to receive at least part of the washer 80 in the receiving zone 90 when the washer 80 is mounted around the centering pin.

In practice, the height of the washer 80 is greater than the depth of the receiving zone 90, such that the washer 80 protrudes from the receiving orifice 38, while protruding relative to the lower face of the central part 12.

Thus, the contact between the arm 4 and the arm support 36 is provided by means of the washer 80.

For example, the outer faces 82 and 86 of the washer 80 are at least partially in contact with radial faces of the receiving zone 90.

It will therefore be understood that, in an assembled configuration, the washer 80 is mounted compressed between the central part of the arm 12 and the arm support 36. The upper end of the washer 80 is in contact [with] a bottom face of the receiving zone 90 and the lower end of the washer 80 is in contact with the arm support 36. The centering pin is received in the central orifice 84 of the washer 80 and in the passage hole of the receiving orifice 38.

Advantageously, the receiving zone 90 includes housings 92 in order to allow the passage of the cable 74. For example, the housings 92 are each formed by a radial widening of the counterbore. The housings 92 are preferably each formed opposite a location of a face 86.

In other words, in this embodiment, the measuring apparatus 40 is integrated into the washer 80, which in turn is integrated into the arm 4.

Aside from this difference, everything which has been described previously regarding the device 2 and its operation, regarding the measuring apparatus 40 and the measuring unit 50, applies to the washer 80 and can be transposed to the present embodiment, such that these details are not described again. In particular, one or several measuring units 50 can be formed on the face 86 instead of being formed on the faces 26 or 28 of the central part 12 of the arm 4.

Using the washer 80 makes it possible to measure the compression forces exerted on the arm more precisely, since the washer 80 is located near the anchoring point of the arm 4 with the frame 8.

The washer 80 also makes it possible not to have to replace the measuring apparatus 40 if the arm 4 breaks, since the measuring apparatus 40 is placed on the washer 80 and the washer 80 can be removed from the rest of the arm 4.

In a variant, the various embodiments can be combined with one another, for example by using a washer 80 having a measuring apparatus 40 jointly with a measuring apparatus 40 formed on a face of the arm 4 or 4' as previously described.

According to still other variants which are not illustrated, the measuring apparatus can be integrated into a current capture device 2 which is suitable for operating according to a lateral capture mode.

For example, the device includes a frame, an arm and a pad playing the same role as those previously described, the pad having its contact face facing laterally toward a power rail mounted laterally, for example with the contact face extending vertically. The arm is for example molded such that the central part includes one or several levers articulated with the frame and the pad, and if applicable, articulated to one another.

Figure 7:
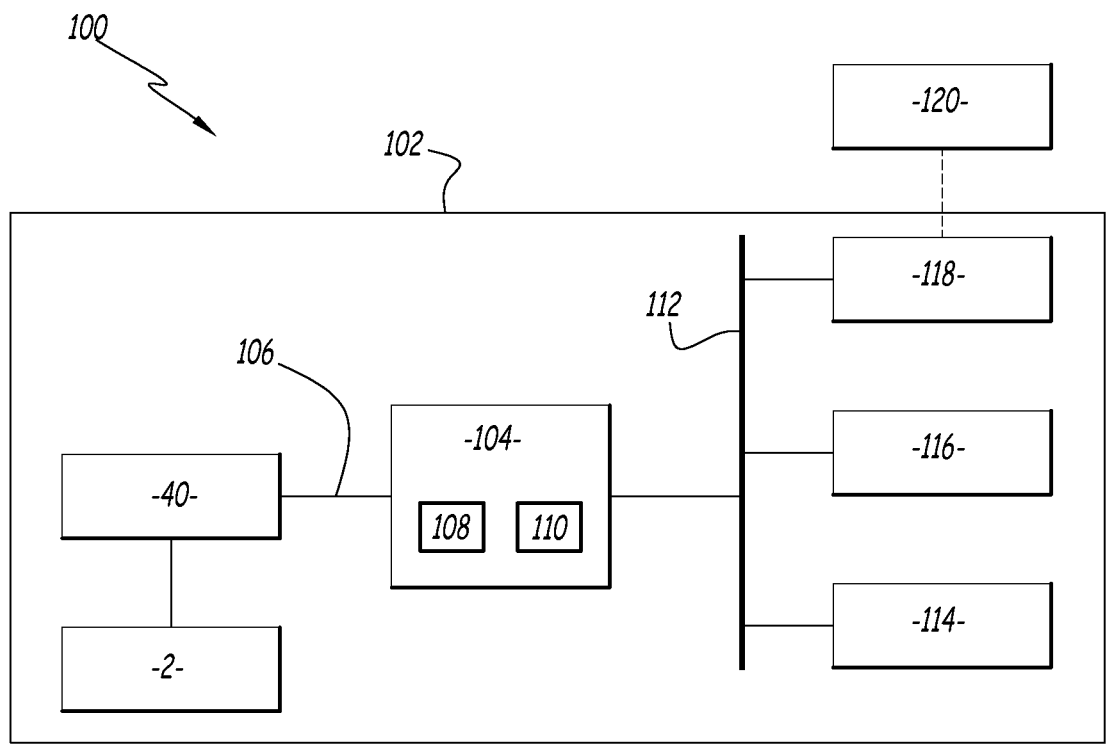
FIG. 7 is a block diagram of an instrumented system equipping a rail vehicle and including the device for capturing a current of FIG. 1.

FIG. 7 shows an instrumented current capture system 100 installed in a rail vehicle 102.

The system 100 includes at least one capture device 2 including a measuring apparatus 40 according to one of the embodiments previously described.

The system 100 also includes an electronic control device 104 connected to the measuring apparatus 40 by a first datalink 106.

For example, the electronic control device 104 includes a logic processing unit 108, here a microprocessor or a microcontroller or a digital signal processor (DSP), and a computer memory 110 in which instructions, in software code form, are stored which can be executed in order to automatically implement a method according to any one of the examples described below. In a variant, the electronic control device 104 includes a dedicated integrated circuit programmed to carry out one or several of said methods.

The system 100 further includes a second datalink 112, a man-machine interface 114 authorizing an interaction with a driver of the vehicle 102, an on board computer 116 of the vehicle 102 and a telecommunications interface 118 suitable for communicating, preferably by a wireless link, with a supervision center 120 outside the vehicle 102.

For example, the system 100 includes a processing unit, not illustrated, in order to condition the measuring signals coming from the sensors 56, for example to filter them and/or to sample them, before they are processed by the control device 104.

According to examples, the first link 106 is a wired link connected to the measuring apparatus 40, for example by means of the cable 74. The wired link can include one or several dedicated cables or a multiplexed cabled link. In a variant, it may be a wireless link, for example a radiofrequency link, preferably a short range wireless link.

The second link 112 connects the control device 104 to the interface 114 and to the computer 116 and to the interface 118. For example, the second link 112 is a wired data bus, such as a fieldbus, for example of the ADC type.

According to embodiments, the second link 112 and/or the interface 114 and/or the computer 116 and/or the interface 118 can be equipment items which are already present in the vehicle 102 and which are used partially by the system 100 while being shared with other functions of the vehicle 102 which are independent of the system 100.

By way of illustrative examples, the interface 114 includes an electronic display screen and/or a lighted indicator and/or a sound indicator and/or a haptic indicator which is suitable for transmitting a message or an indication to the driver of the vehicle 102. The computer 116 is a rail maintenance computer of the TCMS type (for Train Control and Management System). The interface 118 includes a radiofrequency antenna.

According to one example, the device 104 is programmed to automatically calculate the contact force between the pad 6 and the electric power rail as a function of the strain data measured by the sensors 56.

The calculation of the contact force is for example done using a predefined formula as a function of the geometric configuration of the arm 4 and the position of the measuring apparatus 40 in the device 2, this formula being programmed or recorded in the device 104. According to one example, the device 104 is programmed to automatically determine the state of the arm 4 and in particular to detect a break of the arm 4, for example when the force measured by the sensors 56 exceeds a predetermined threshold value, or when the measured contact force exceeds a first predefined threshold. For example, the first threshold corresponds to a transverse force greater than or equal to 1000 N.

According to another example, the device 104 is programmed to measure the forces experienced by the arm over time. This measurement can be carried out regularly or at predefined instants. The results of the measurement are for example stored in the computer 116, for example in a log file, and/or sent to the maintenance center 120 by means of the interface 118.

Thus, at the output, the device 104 is programmed to provide, for example in real time or periodically over time, information on the state of the arm 4 and information on the value of the pad/rail contact force.

Advantageously, when the temperature sensor 58 is used, the device 104 is also programmed to automatically correct the data measured by the sensors 56 as a function of the measured temperature. The temperature measured by the sensor 58 can also be provided at the output by the device 104 independently of the corrections done.

According to examples, the device 104 or the computer 116 is programmed to send an alert to the interface 114 when a break of the arm 4 is detected by the device 104 owing to the measurements by the apparatus 40.

Thus, in response, the driver of the vehicle 102 can stop the vehicle immediately, in order to avoid any damage of the vehicle or of the rail infrastructure.

According to another example, the device 104 or the computer 116 is programmed to record an abnormal state of the arm detected by the device 104 owing to the measurements by the apparatus 40, such as abnormal damage of the arm, for example when the measured force exceeds a second predetermined threshold value while remaining below the first threshold value.

For example, a message reporting this event is automatically sent to the maintenance center 120, by means of the interface 118. The corresponding event can also be stored in a log file recorded in a memory of the computer 116. A warning can also be displayed on the interface 114.

The embodiments and variants considered above may be combined to lead to new embodiments.

The invention claimed is:

1. A device for capturing an electric current for a rail vehicle, the capture device including:
   a pad intended to come into contact with an electric power rail;
   a frame;
   an electrically conductive arm which mechanically and electrically connects said frame to said pad, the arm comprising a central part coupling said frame to a support portion on which said pad is mounted; and
   a measuring apparatus for measuring the mechanical forces exerted on said arm, the measuring apparatus comprising strain sensors which are integrated on the inside of an electrical isolation structure, such that the strain sensors may be electrically insulated from said arm, the isolation structure comprising a glue layer deposited on a receiving surface and a ceramic layer covering the glue layer, and wherein said strain sensors are arranged on the ceramic layer.

2. The device according to claim 1, wherein said measuring apparatus is mounted on an upper face of said central part of said arm.

3. The device according to claim 1, wherein said measuring apparatus is mounted on a side face of said central part of said arm.

4. The device according to claim 2, wherein said strain sensors comprise two groups of strain sensors, each group of sensors being associated with a measuring circuit, the two groups of sensors being mounted on the same face of said central part and placed at different distances from said frame.

5. The device according to claim 1, wherein said frame comprises an arm support, wherein said central part of said arm comprises an orifice for receiving a centering pin mounted on said arm support, wherein said arm further comprises a washer which is at least partially received in said orifice while being mounted around the centering pin and compressed between said central part of said arm and said arm support, such that said arm rests on said arm support by means of said washer, and wherein said measuring apparatus is mounted on an outer receiving surface of said washer.

6. The device according to claim 1, wherein said measuring apparatus further comprises a temperature sensor placed near at least one of said strain sensors.

7. The device according to claim 1, wherein the isolation structure further comprises an encapsulating layer made from resin or varnish which covers said strain sensors.

8. The device according to claim 1, wherein the thickness of the glue layer is between 10 μm and 1 mm.

9. The device according to claim 1, wherein the thickness of the ceramic layer is between 0.05 mm and 3 mm.

10. A current capture system for a rail vehicle, comprising:
    a device for capturing electric current according to claim 1; and
    a processing unit connected to the measuring apparatus of said device, and programmed to detect a break of the arm of said device, and/or to calculate a contact force between the pad of said device and an electric power rail from strain measurements coming from the measuring apparatus.

* * * * *